United States Patent

[11] 3,584,293

[72] Inventor Keigo Iizuka
 Toronto, Ontario, Canada
[21] Appl. No. 876,533
[22] Filed Nov. 13, 1969
[45] Patented June 8, 1971
[73] Assignee Chevron Research Company
 San Francisco, Calif.

[54] ELEMENTS FOR STEERING THE BEAM OF HELICAL ANTENNA FOR USE IN A BOREHOLE PENETRATING AN EARTH FORMATION
15 Claims, 16 Drawing Figs.

[52] U.S. Cl...................................................... 324/5,
 324/6, 324/7
[51] Int. Cl....................................................... G01v 3/12,
 G01v 3/18

[50] Field of Search.......................................... 324/6, 5, 7

[56] References Cited
UNITED STATES PATENTS
3,449,657 6/1969 Fredriksson.................. 324/6

Primary Examiner—Gerard R. Strecker
Attorneys—A. L. Snow, F. E. Johnston, G. F. Magdeburger, R. L. Freeland, Jr. and H. D. Messner ABSTRACT: Active control elements for switching the radiation pattern of the helical antenna between the pancake beam and bidirectional pencil beam for use in mapping an earth formation penetrated by a borehole.

PATENTED JUN 8 1971 3,584,293
SHEET 1 OF 4
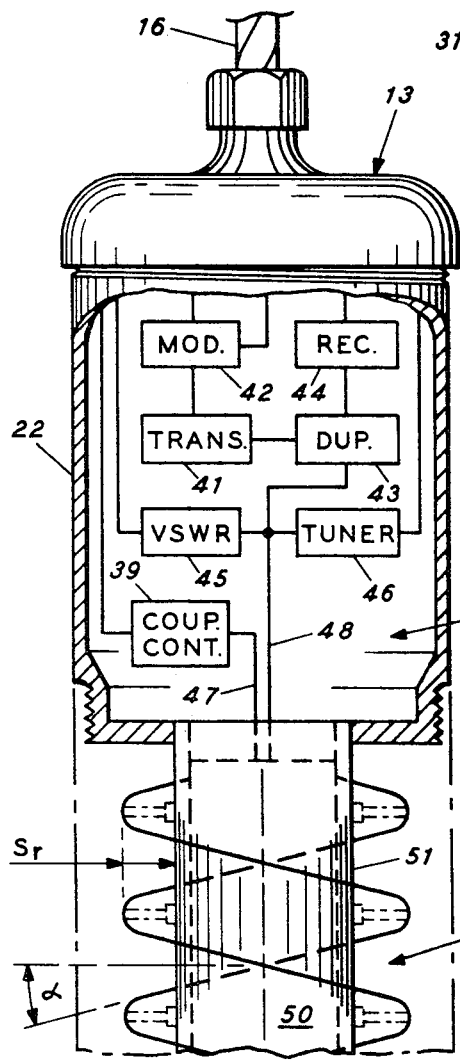
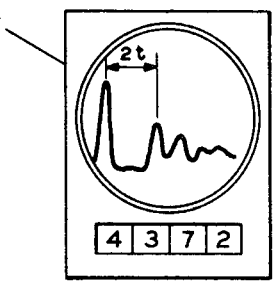
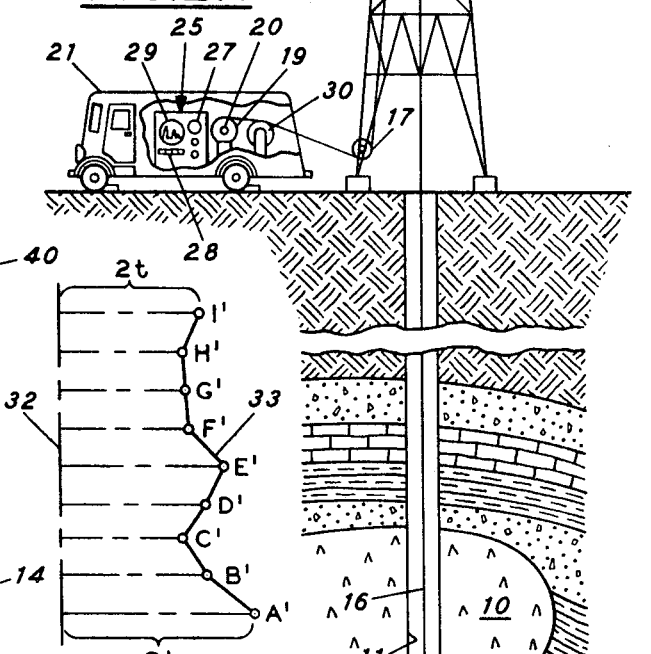
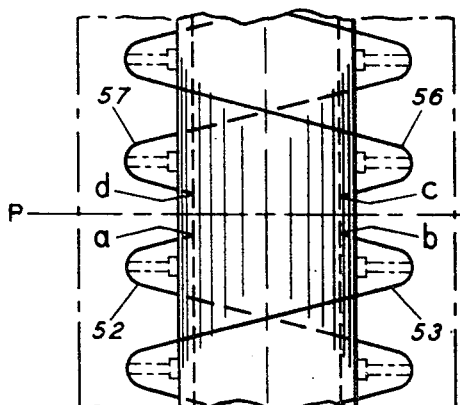
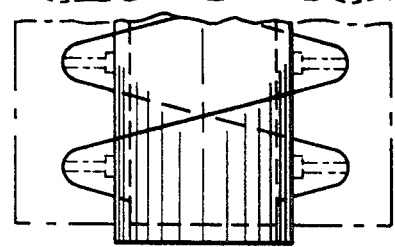
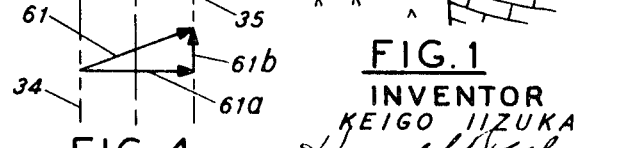
FIG.2A
FIG.2B
FIG.3
FIG.4
FIG.1
INVENTOR
KEIGO IIZUKA
BY Harold L. Jessup
Ralph L. Freeland Jr.
ATTORNEYS

INVENTOR
KEIGO IIZUKA
BY
ATTORNEYS

INVENTOR
KEIGO IIZUKA
BY
ATTORNEYS

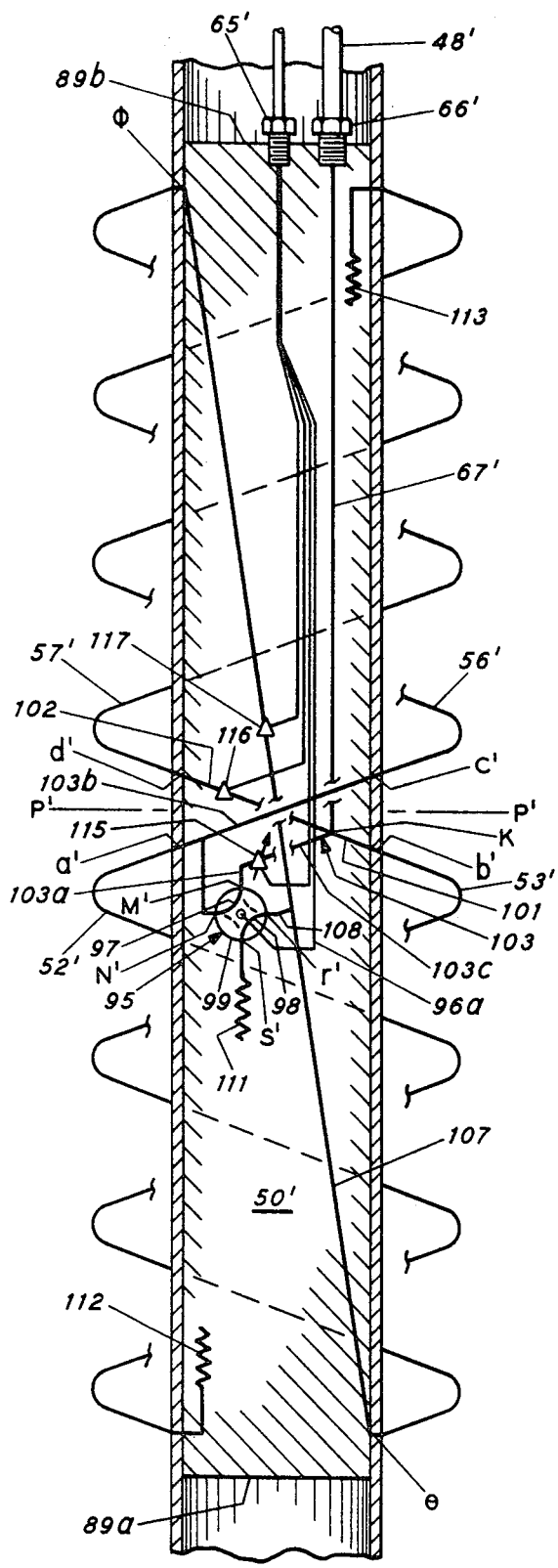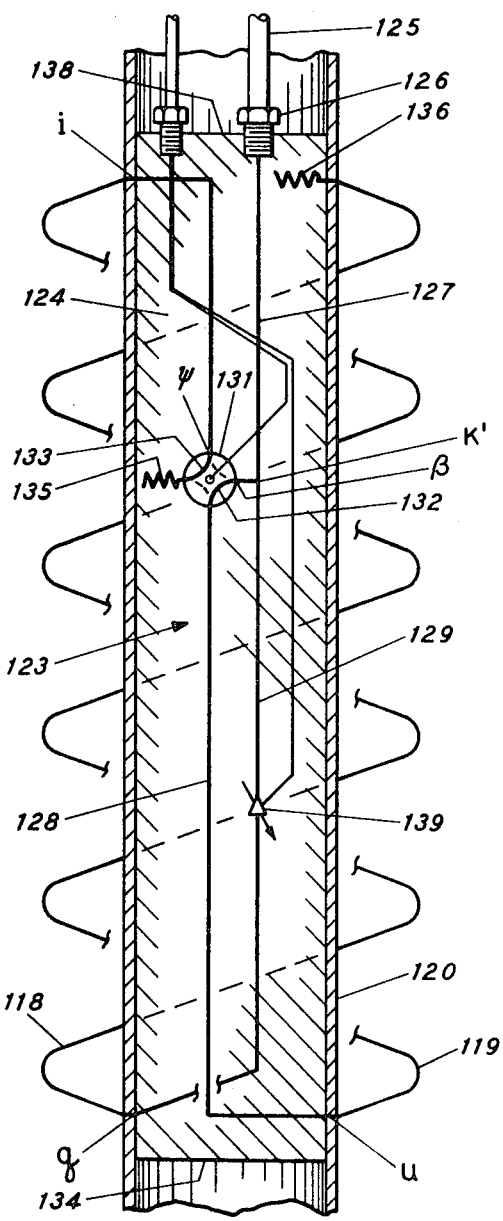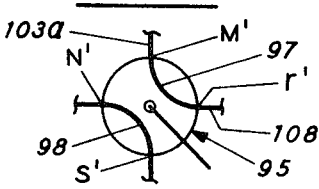

ELEMENTS FOR STEERING THE BEAM OF HELICAL ANTENNA FOR USE IN A BOREHOLE PENETRATING AN EARTH FORMATION

This invention relates to the exploration for oil and to the mapping of the sides of a salt body from within a borehole penetrating that body. More particularly, the invention relates to a method and apparatus for sequentially emitting electromagnetic energy from an antenna system within the well bore into the salt dome at a known elevation and receiving reflections of the launched energy from the sides of the dome. The transmission, reflection and reception of the energy are then related to time; and the time of travel of the emitted energy (from the source to the reflector and back) is related to horizontal distance and recorded in accordance with the depth of the antenna below the earth's surface to permit mapping of borehole). interface of the salt dome.

A particular object of the present invention is to provide a novel method and apparatus for controlling the radiation pattern of the antenna, thus facilitating the mapping of the boundary of the salt dome. In accordance with the present invention, the radiation pattern of the antenna can be altered between (a) omnidirectional and (b) bidirectional in azimuth with respect to the antenna axis (and, assuming the antenna is coincident with the borehole, the axis of the borehole). In the elevational direction, i.e., in planes perpendicular to the axis of the borehole, the radiating fields (in either operating mode) are highly directional. By comparing the radar images from reflections derived by the antenna operated in both operating modes, prospecting for oil and/or other minerals is considerably facilitated.

The art to which the present invention relates is described in U.S. Pat. No. 3,449,657, issued June 10, 1969, entitled "Helical Antenna for Irradiating an Earth Formation Penetrated by a Borehole and Method of Using Same," O. A. Fredriksson et al. In that patent a method and apparatus is described in which a helical antenna is utilized for mapping the distance to the flanks of a salt dome from a borehole penetrating the dome. In that patent a helical antenna system is described to accomplish emission of electromagnetic radiation in the environment of a borehole drilled thousands of feet into a salt dome. The radiated energy is transmitted, in the transmitting mode, from the helical antenna into the dome. Reflected energy from electromagnetic discontinuities at the flanks of the dome (echoes) is received by the antenna, in the receiving mode. Travel time of the energy from the discontinuity and back is measured and the distance from the antenna to the near salt flank is approximated by computation from the known velocity of energy transmission through the salt to permit mapping of the dome.

In the aforementioned patent, the efficiency of the antenna is improved by forming the antenna radiating elements of a multiplicity of coextensive pairs of interwound helical conductors (say first and second coextensive pairs) extending along a central cylindrical mast. The axis of symmetry of the central mast is preferably coincident with the centerline of the borehole, and the helical antenna may extend along the borehole for several feet, say 15 feet. In a preferred described embodiment, each of the first and second pairs of helical conducting elements begin substantially at the midpoint of the central mast and wind in the same circumferential direction towards respective ends of the antenna. Situated within the central mast at the midpoint of the antenna adjacent to the ends of helical conductors is a microwave coupler. Electromagnetic energy is coupled from a source (either located within the sonde or at the earth's surface) through a single input/output transmission line connected to the microwave coupler and thence to centrally located feed points for the antenna. In the aforementioned embodiment, each pair of helical elements is driven from the coupler using energization feed points to produce in-phase propagation in the axial direction from the coupler toward the ends of the antenna. As a result, the energy is radiated in planes transverse to the axis of the borehole (pancake beam, broadside radiation pattern) into the adjacent formation.

The present invention relates to improvements in the coupler for the aforementioned helical antenna system. Specifically, it is desirable, in many applications, to correlate radar images obtained using omnidirectional emitted radiation with radar images obtained from more directively emitted radiation. Further, radar images of differently polarized radiation, say vertical or horizontal, may also be a relevant factor in resolving the texture of the flank of the salt dome. (Polarization relates to the direction of the electric field components of the radiated electromagnetic energy in its principal direction of propagation.)

It is an object of the present invention to provide a novel method and apparatus related to remote electrical and/or electromagnetic switching of the energization feed points of the helical antenna by means of active control elements. It is desirable in the present invention that the radiation pattern of the antenna be easily changeable, say from an omnidirectional pattern in azimuth (pancake) to a more directive mode of radiation, say a figure-eight pencil beam having twin, in-line directive lobes, in azimuth, even though the antenna is located thousands of feet below the earth's surface. It is also desirable that the directive lobes of the resulting figure-eight pencil beam of radiation be steerable in azimuth so as to focus to the direction from which radar images are obtained. It is further desirable that the direction of the polarization of the wave be variable so that the radar images from common reflection points provided in one polarizing mode (e.g., vertical) can be compared with radar images associated with another polarizing mode (e.g., horizontal).

In accordance with the present invention, the radiation pattern of a multielemented helical antenna within a borehole penetrating the earth is systematically controlled, in azimuth, by operation of a switching coupler housed within the central mast of a helical antenna. In one mode of operation, the antenna system of the present invention is energized at feed points near the midpoint of the central mast so as to emit radiation in a broadside pattern (pancake beam) as first and second pairs of electromagnetic waves travel from the coupler towards respective ends of the antenna. In this regard, each of the pairs of electromagnetic waves is controlled, in phase, so that traveling wave current phasers of each pair of waves are in phase at the circumference of each pair of helical conductors as measured in any given azimuthal direction. The emitted radiation, although omnidirectional in azimuth, is highly directional in planes normal to the axis of a well bore (elevational direction).

In a second mode of operation, the coupler is actuated through an active control circuit. The associated circuitry can include rotor means which when energized causes rotation of the coupler from one position to another whereby the feed point distribution of the antenna is reoriented. More particularly, the feed points one of each pair of the helical conductors are reversed. An electromagnetic wave guided by one of a pair of helical conductors no longer propagates in the same direction as the wave guided by the other of the pair, but travels in opposite axial directions. The diameter of the helix is chosen in such a way that these two traveling waves are the same in phase at a certain angle in azimuth (direction of maximum radiation intensity) and are opposite in phase at another angle in azimuth (direction of minimum radiation intensity); thus the radiation from the antenna can be made directional. If the diameter of the antenna is chosen such that two directions of maximum radiation intensity and two directions of minimum radiation intensity alternate, the resulting radiation pattern resembles a bidirectional pencil beam in azimuth. The pattern, invention, remains highly directional.

The present invention also provides for phase shifting means for the antenna of the present invention which can, likewise, be controlled by active circuitry elements. As the phase shifting means is actuated (so as to shift the phase of the wave through various phase angles), the effect is to "steer" the figureeight radiation pattern, in azimuth, along different directions relative to the axis of the well bore. Result: greater reliability as to the direction and distances to and from electromagnetic discontinuities within the salt dome relative to a given azimuthal direction from the well bore. Radar images, in each mode of operation, can also be recorded and, later, correlated as to direction. In yet another embodiment of the present invention, the phase shifters (0° and 180°) can be located within the helical antenna of the present invention. Specifically, if the two-stage phase shifters are set to operate in the 0° phase shift mode, the energy radiated from the antenna (whether operated in a broadside radiation mode or in the figure-eight pencil beam mode) will be of horizontal polarization. Contrary, if the two-stage phase shifters are set to operate in the 180° phase shift mode, the polarization of the energy will be vertical. The resulting radar images in each polarization mode can be recorded and the resulting records can provide a new comparison quantity: the record with vertical polarization, as to common reflection areas, can be compared with a record with horizontal polarization, with the result that the true textural nature of the common reflection areas can be better indicated.

Further objects and advantages of this invention will become more apparent from the following detailed descriptions taken in conjunction with the accompanying drawings which form a part of this specification:

In the Drawings:

FIG. 1 is a partial section of an earth formation including a salt dome penetrated by a borehole and illustrates a logging sonde and other apparatus for energizing the logging sonde and for transporting, depthwise, the sonde through the borehole penetrating the salt dome;

FIG. 2a is a representation of the face of a recording instrument displaying the information to be derived from the logging sonde of FIG. 1;

FIG. 2b is a two-dimensional plot of the near flank of the salt dome of FIG. 1 as a function of depth;

FIG. 3 is an elevational view of the sonde of FIG. 1, partially cut away, to illustrate the improved antenna system of the present invention, the antenna adapted, in operation, to emit vertically polarized radiation into the salt dome of FIG. 1;

FIG. 4 is a plot of traveling wave current phasers propagating, during operation of the antenna of FIG. 3, to provide for emission of vertically polarized radiation;

FIG. 11 is an elevational view, partially cut away, of a modification of the helical antenna of FIG. 6, illustrating a switching coupler, in partial schematic form, for changing the polarizing pattern from the first to the second operational mode;

FIG. 11a is a detail of the switching coupler of FIG. 11 operating in the second operating mode; and FIG. 12 is a sectional view of yet another embodiment of the helical antenna of the present invention.

Figure 6:
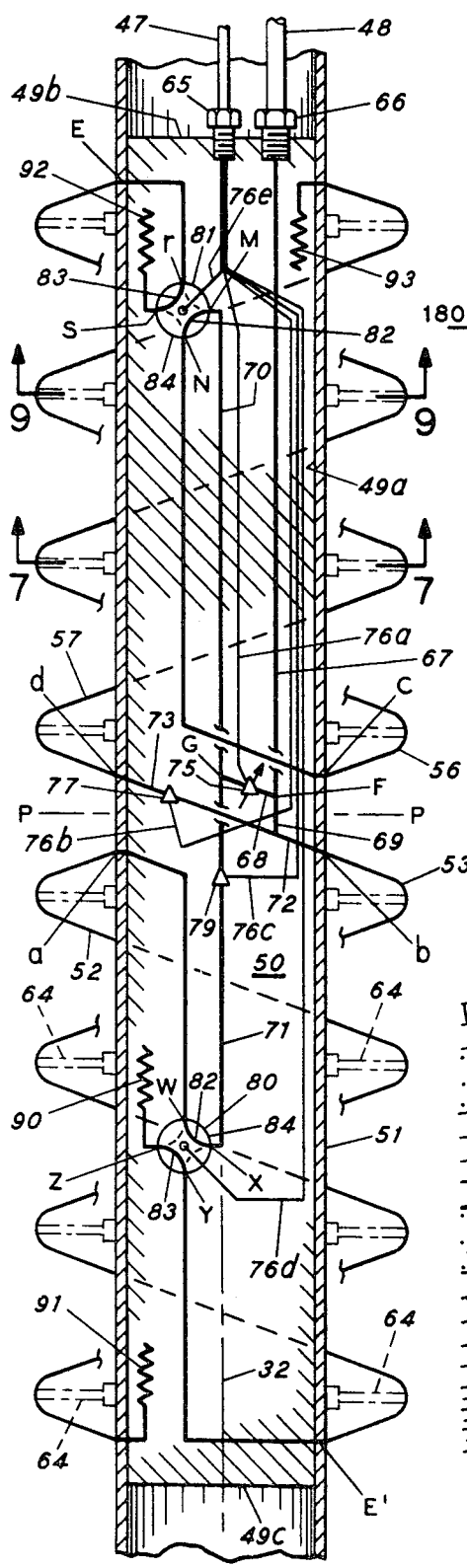
FIG. 6 is an elevational view, partially cut away, of the helical antenna of FIG. 3 particularly illustrating the switching coupler, in partial schematic form, also illustrating active switching elements for changing the polarizing pattern.

Referring now to FIG. 1, a section of a salt dome 10 is shown penetrated by a borehole 11 offset from the center of the dome so as to be adjacent to one of its flanks. In order to accurately define the near sidewall of the dome 10 through controlled emission and reception of electromagnetic energy, an exploration sonde 13 incorporating an electromagnetic helical antenna, generally indicated at 14, is transported along the borehole so as to be placed adjacent to different horizontal sections of the dome. The purpose of mapping the near side of the salt dome-sedimentary interface 12 is to identify those areas where oil deposits 15 are most likely to be found adjacent the sidewall of the dome.

To provide movement of the sonde 13 through the borehole 11, a logging cable 16 is connected through sheaves 17 on derrick 18 to cable drum 19. Motor 20 powers drum 19 on hoist truck 21 to raise and lower the sonde.

As the borehole 11 may be filled with a dense drilling fluid to prevent intrusion of the earth formation into the borehole, the sonde 13 must be fluidtight at the mating joints of the upper housing 22 with lower housing 23 supporting the helical antenna 14. The upper housing 22 is connected to the lower housing 23 by union collar 24 as indicated.

Located within truck 21 is a console 25 downhole a power source and associated coupling circuitry suitable for feeding timing signals along logging cable 16 to the sonde 13, as well as indicators for the source and coupling circuitry. Console 25 may also include surface recording equipment including at least three indicators: one for impedance match, indicator 27; another for depth, indicator 28; and another for distance, indicator 29. The impedance match displayed on indicator 27 relates to the power transfer between the helical antenna 14 and coupling circuitry within the sonde 13 as a function of their respective impedances, and the matching is performed downhole during operation of the antenna. Depth indicator 28 shows the mapping depth of the antenna in the borehole 11 and is measured by pulley 30. The distance of the borehole to the sidewall of the near side of the salt dome at each mapping depth is a function of the time between transmission and reception of the electromagnetic energy by the antenna and is displayed on indicator 29. The information on the indicator 29 and the depth indicator 28 can be simultaneously recorded using a camera to produce a photographic plate of the type indicated at 31 in FIG. 2a. Plate 31 indicates the two-way travel time (2T) for the emitted signals, and a series of these photographs may be reduced to a two-dimensional plot, such as shown in FIG. 2b, in which the location of the near wall of the salt body relative to antenna axis 32 is represented by line 33 connecting mapped points A', B', C', D', E', etc.

Reference should now be had to FIG. 3. This figure depicts the interior of sonde 13 in more detail illustrating how the helical antenna system of the present invention utilizes timing signals fed from control console 25 to initiate mapping operations. As indicated, an energization section 40, schematically illustrated, is positioned at the interior of the upper housing 22 and includes transmitter 41 which, in operation, is periodically energized through modulator (pulser) 42 so as to generate electromagnetic pulses of high power and relatively short duration. Since the helical antenna 14 downhole from the energization section 40 is used for both transmitting and receiving, a switch arrangement 43, called a duplexer, is connected across the transmitter 41 and a receiver 44 as indicated. As well understood, the duplexer 43 isolates the sensitive receiver 41 from the transmitter when energy is fed to the antenna and then connects the antenna to the receiver in the internal between pulses where the reflected energy is to be received.

VSWR coupler 45 is connected so as to sense the energy transmitted between the duplexer 43 and the antenna 14. The coupler 45 samples the energy in the connecting transmission line to indicate the power transferred to the antenna as a function of the relative impedances of the antenna 14 and the energization section 40.

The maximum power transfer from the transmitter to the antenna can be achieved in the present invention through a stub tuner 46 connected in parallel with VSWR coupler 45. Operation of tuner 46 is adjustably controlled by circuitry within the console 25 as the console operator monitors the response of VSWR coupler 45 at indicator 27 (FIG. 1).

During operation of the antenna system in a first mode of operation, all helices are driven from a midportion p-p of the antenna 14 by means of axially extending switching coupler 50 interior of central conducting cylinder (mast) 51 of the antenna 14. Switching coupler 50 includes electrical conductors 47 and 48 for connection, uphole, to energization section 40. In the first mode of operation, the helical antenna 14 of the present invention can be thought of, fundamentally, as a "-transmission line" directing first and second pairs of electromagnetic waves, each pair beginning at the midportion p-p of the antenna and helically winding in opposite sense to the remote ends of the antenna. To provide for appropriate electromagnetic propagation, the helical antenna 14 includes helical conductors 52, 53 and 56, 57 symmetrically disposed on either side of a reference plane p-p, and central cylinder 51 inwardly spaced from the helical conductors. Energy is fed from the energization section 40 through the coupler 50 between the helical conductors 52, 53 and 56, 57 and the central cylinder 51. Feed points to the helical conductors, in the first operating mode, are indicated at four feed points a, b, c and d adjacent to the midportion of the antenna.

In the second mode of operation, as explained in detail below, coupler 50 is appropriately energized by the active control circuitry to provide new feed points for coupling energy from section 40 to the antenna 14 so as to provide a more directive radiation pattern. The characteristics of the resulting radiation patterns, in either the first or second mode of operation of the antenna, are dictated, of course, by the characteristics of the electric and magnetic fields of the energy propagating between the helical conductors 52, 53 and 56, 57 and the central cylinder 51. Accordingly, a brief description of the character of the electromagnetic waves in each operating mode is in order.

First Operating Mode of the Antenna System

During the first mode of operation of the helical antenna, the electromagnetic waves guided by the first and second pairs of helices are driven at a, b, c and d and terminated at both ends of the antenna. A first pair of electromagnetic waves can be thought of as propagating in helical paths between coextensive electrical conductors 52 and 53 and the central cylinder 51. Similarly, a second pair of waves can be thought of as helically propagating in an opposite axial direction as between the remaining pair of coextensive helical conductors 56 and 57 and the central cylinder 51. Each propagating adjacent pair of electromagnetic waves have several common characteristics. The phase of the electromagnetic wave guided by one of a pair of helices is identical with that of the wave guided by the other of the pair at any azimuthal angle. Each wave thus contributes to the intensity of the resulting radiated field. Further, the electric field component radiated from the current on an incremental length of a wire is parallel to the direction of the incremental length of the wire and its magnitude is proportional to that of the current and its phase is determined by the distance between the current element and the point of observation of the field. As can be seen in FIG. 3, the helical conductor lengths make an angle ($\alpha$), i.e., pitch angle, with the plane perpendicular to the axis of the cylinder 51. To provide a constant pitch angle $\alpha$, the helical conductors are radially spaced from the central conductor 51 a constant radial distance ($S_r$). The resultant field can be calculated by a vectorial summation of the contributions of all current elements. Accordingly, the pairs of traveling wave currents propagating in opposed axial directions on the antenna may be adapted to interact as a function of their position along the antenna, as measured in opposed but equal axial distances from the central plane p-p so as to provide a particular type of polarization.

FIG. 4 illustrates, in partial schematic form, traveling wave current phasers propagating on azimuthally aligned portions of each pair of electrical conductors 52, 53 and 56, 57 of FIG. 3. To provide for vertically polarized radiation, the traveling wave phasers along the same azimuthally aligned segments of one set of conductors (say conductors 52 and 53) must be of the same magnitude and of the same polarity relative to one another and, most importantly, must be of opposite polarity to symmetrically located traveling wave current phasers propagating in an opposite direction on the oppositely extending pairs of helical conductors. Correlation of the resulting current phasers, for this example, is taken at equal distances from the central axis 32 of the antenna measured in the same mean azimuthal direction. As shown, the current phasers are represented by arrows 58, 59, 60 and 61. These arrows indicate that the instantaneous current phasers found in axially spaced sections of each pair of helical conductors can be defined by an imaginary geometrical figure, the figure extending along the antenna and having a wedge-shaped cross section, one corner of which is located on the antenna axis 32 and the two remaining corners of which are located on parallel lines 34 and 35. (Lines 34 and 35 are radially spaced from but parallel to the axis 32.) The current vectors may be resolved into vertical vectors 58b, 59b, 60b and 61b and the horizontal aligned vectors 58a, 59a, 60a and 61a. Accordingly, the first pair of waves, say propagating between helical conductors 52 and 53 and the central cylinder 51, interact with the second pair of waves (on the oppositely aligned segment of the antenna) to generate vertically polarized electromagnetic energy.

Figure 5:
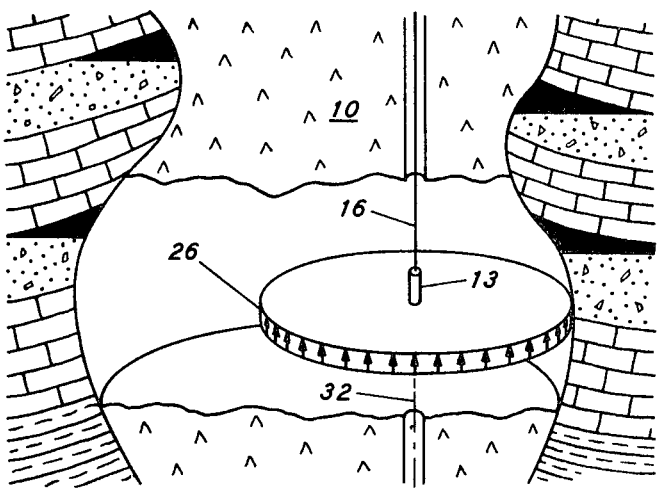
FIG. 5 is a partial, perspective section of the salt dome of FIG. 1 illustrating the radiation pattern provided by the helical antenna of FIG. 3 operating in a first radiation mode.

The polarization of the resulting radiated field relates to the direction of the electric field components of the radiated field in the principal direction of propagation. FIG. 5 illustrates the geometry of the resulting electromagnetic radiation provided by the antenna 14 of FIG. 3, the vertical polarization character of which having been previously described in some detail in FIG. 4. As shown in FIG. 5, the radiated field (from a broadside radiating helical antenna located within sonde 13) is in the form of a geometrical solid revolution. A small section of energy (called a wave front) is generally indicated at 26 perpendicular to the direction of travel of the energy. The electric field components of the energy are seen to be vertically polarized.

FIG. 6 is an elevational view, partially cut away, of the helical antenna of FIGS. 3 and 5 illustrating, in schematic form, the elements of switching coupler 50.

It is contemplated that the switching coupler 50 of the present invention will be constructed of laminated, flat metallic plates fitted together along their adjacent broad sides (flats) to form a housing. The housing is illustrated as being cylindrical and having a sidewall 49a in surface contact with the interior wall of central cylinder 51. End wall 49b of the housing is fitted with connectors 65 and 66 ultimately connecting, uphole, through conductors 47 and 48, respectively, to the energization section 40. As conductor 48 is a conventional coaxial line, it is convenient to couple the outer conductor thereof to the central cylinder 51 of the antenna 14, the connection point occurring, preferably at connector 66. In that way, the conducting path is through connector 66 and the coupler housing to the cylinder 51. Cavities (not shown) in adjacent broad walls of the metallic plates (each cavity being preferably semicircular in cross section) are provided by milling or machining operations prior to their assembly to form the coupler housing. These cavities serve as entryways for receiving (and supporting) the inner conductor of the input/output conductor 48 by which electromagnetic energy is transferred between the helical antenna and the energization section 40. The inner conductor of conductor 48 can be supported within the cavities by annular insulating discs. In a similar manner, at the exterior of the antenna, the helical conductors can be insulated from the central cylinder 51 by radially extending insulating posts 64. For an example of laminated coupler construction techniques, see the aforementioned patent of O. A. Fredriksson et al., U.S. Pat. No. 3,449,657. After passage through the coupler 50, the energy can be coupled, in turn, between the helical conductors 52, 53 and 56, 57 as at the feed points $a$, $b$, $c$, and $d$, and the central cylinder 51 so that traveling wave current can be established along the antenna in the manner previously mentioned. All radio wave cables inside the coupler 50 function as coaxial cables unless otherwise specified.

Mechanical arrangement of the inner conductor of the conductor 48 interior of coupler 50 forms an important aspect of the present invention. As shown in FIG. 6, the inner conductor of conductor 48 comprises a series of split conductors split into a series of extensions for multiple coupling of energy to the antenna. In particular, line sections 68 and 69 form the first split segments of the series of split conductors and are seen, at point F, to connect in parallel to the main input segment 67. Each section 68 and 69, in turn, is split into extensions to form the correct mode of excitation of the helical antenna. In more detail, line section 68 is split into the two U-shaped extensions 70 and 71. Extension 70 extends longitudinally from its attachment point G to line section 82 at an arcuate area near the uphole end of the coupler and then loops back toward the midportion $p$–$p$ of the coupler for connection to helical conductor 56. Extension 71 extends from line section 68 at point G in an opposite direction to that of extension 70 to an arcuate area near the opposite downhole end of the coupler and then loops back toward the midportion $p$–$p$ for connection to helical conductor 52. The remaining helical conductors 53 and 57 connect to line section 69 through diagonally extending extensions 72 and 73. The feed points $a$, $b$, $c$ and $d$, viewed in elevation (FIG. 6) are seen to define an imaginary parallelogram lying in a common plane and having parallel opposite sides centered at the midplane $p$–$p$. Diagonal coupling points $b$ and $d$ connect to extensions 72 and 73 and form one set of coupling points. The other two diagonal coupling points $a$ and $c$ connect to the U-shaped extensions 71 and 70, respectively, and form a second set of coupling points.

Figure 7:
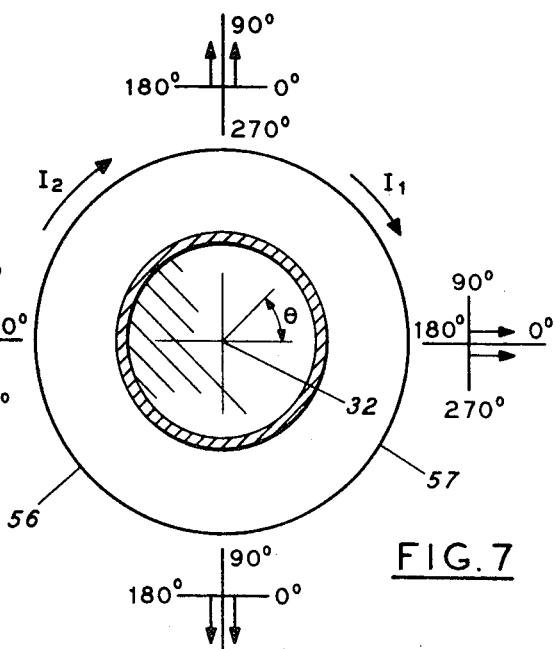
FIG. 7 is a sectional view taken along line 7-7 of FIG. 6 illustrating, in detail, operational principles of the helical antenna of the present invention when operating in the first operating mode.

Energization of the antenna with energy of correct polarity depends upon the relative line length of the differing combinations of split conductors forming extensions from input/output conductor 48 within the coupler 50. In more detail, if the combined length of section 69 and extension 72 or 73 is exceeded by the length of section 68 in combination with extension 70 or 71 by a distance, say equal to $M\lambda f/2$ where M is any cardinal number and $\lambda f$ is the operating wavelength of energy in the salt dome, correct feeding conditions exist. When M is an odd number the direction of the polarization is vertical, and when M is an even number the direction of the polarization is horizontal. Each pair of helical conductors 52, 53 and 56, 57 have one conductor of each pair fed 180° out of phase with the other helical conductor comprising each coextensive pair. In this regard, a variable phase shifter 75 may be located, in series, in section 68 to aid in the control of phase of the energy at the feed points $a$, $b$, $c$ and $d$. The operation of phase shifter 75 is controlled by signals generated uphole from the antenna, as within console 25 operating in association with coupler controller 39 positioned within energization section 40 (FIG. 3). The control signals enter coupler 50 via conductor 47 at end wall 49$b$ of the coupler housing, and are conveyed to the phase shifter interior of the coupler by wire conductor 76$a$. It should be noted that while along successive transverse sections of the helical conductors the polarity of the traveling wave current phasers undergoes periodic change, the relative polarity along common azimuthal directions remains in phase to generate the desired vertically polarized energy output. As shown in FIG. 7, which is a section taken along a transverse plane through the antenna of FIG. 6, the current phasers $I_1$ and $I_2$ along separate helical conductors 56 and 57 are depicted in partial schematic form. In the same transverse plane, $I_1$ and $I_2$ are of opposite polarity, but along equalized conductor increments in common azimuthal directions measured from axis 32 of the antenna, they are in phase. Vector summation of the phasers $I_1$ and $I_2$ produces the results depicted at the periphery of the helical conductors, which indicate for the azimuthal angle $\theta$ equals 0°—360° $I_1$ and $I_2$ are in phase.

However, the polarization mode of the helical antenna of FIG. 3 is not limited, in operation, to vertical orientation only but can be changed to a horizontal configuration by operation of active elements within switching coupler 50. In many borehole applications, signal resolution can be increased by changing the polarizing mode of the radiated energy, say from a vertical to a horizontal orientation, while the sonde remains positioned many feet below the earth's surface.

Figure 8:
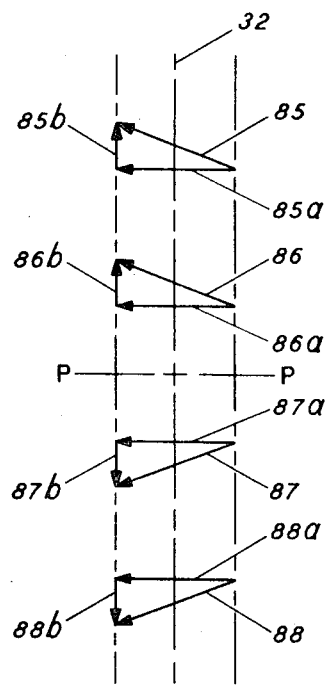
FIG. 8 is a plot of traveling wave current phasers propagating, during operation of the antenna of FIG. 3, to provide for emission of horizontally polarized radiation.

Referring again to FIG. 6, extension 73 of coupler 50 is seen to be connected to helical conductor 57; located at an intermediate position along extension 73 in series therewith, is a two-stage phase shifter 77 electrically controlled by the control circuitry through wire conductor 76$b$ and connector 65. For the helical conductor 52 a second phase shifter 79 is located, in series, along extension 71 terminating in contact with the helical conductor 52. Phase shifter 79 is controlled by uphole control circuitry through wire line 76$c$. Both phase shifters 77 and 79 have two settings: 0° phase shift setting and 180° phase shift setting. At 0° phase shift position the phase of the energy being coupled to the respective in series helical conductors 57 and 52 is not affected. However, when the phase shifters 77 and 79 are changed to 180° phase shift setting by means of timing signals from uphole of the antenna, each phase shifter causes 180° phase shift of the energy being coupled to the helical conductor. As a result, the phases of the current at $c$ and $b$ are in phase and those of $a$ and $d$ are also in phase, but phases at $c$ and $d$ are 180° out of phase. With these phase arrangements of the direction of the polarization becomes horizontal. FIG. 8 shows the vector diagram of the current on the helical wires. As shown in FIG. 8, the traveling wave current phasers on each pair of helical conductors 52, 53 and 56, 57 along the same azimuthally aligned segments must be of equal magnitude and, most importantly, must be of the same polarity as respective traveling wave current phasers on oppositely extending pairs of helical conductors at equal distance from the midpoint plane $p$–$p$ and in a common azimuthal direction relative to axis 32. When these conditions exist, traveling wave phasers represented by the arrows 85, 86, 87 and 88 are generated along the antenna and these phasers are resolvable into reinforcing horizontal vectors 85$a$, 86$a$, and 87$a$ and 88$a$ and into cancelling vertical vectors 85$b$, 86$b$, 87$b$ and 88$b$. The result is the generation of horizontally polarized radiation. The circumferential turn length of the helical conductors should also be a constant value equal to a value related to the phase of the adjacent pairs of electromagnetic energy. In that way the pairs of electromagnetic waves can be correctly phased for interaction in both the longitudinal and radial directions along the length of the antenna. A common turn length of $N\lambda_f$ is preferred where N is any integer, preferably 1, and $\lambda_f$ is the operating wavelength of the electromagnetic energy in the adjacent earth formation such as a salt dome.

During operations it is desired that reflections from the ends of the antenna be minimum. For this purpose, matched loads 90, 91, 92 and 93 within the coupler 50 of FIG. 6 are located adjacent to the ends of the helical conductors 52, 53 and 56, 57.

Second Operating Mode of the Antenna System

During the second mode of operation of the helical antenna of the present invention the first and second pairs of electromagnetic waves can be thought of as propagating along the antenna in a helical fashion, in the manner previously described, but they interact in a much more complex manner. It is convenient to think first of the direction of the propagation of each wave comprising each pair of waves: In the second operating mode of the antenna, one of the waves comprising each pair of waves propagates in an axial direction opposite to that of the other wave. First, consider the waves which propagate in the same direction. The wave associated with helical conductor 53 begins at the feed point b in both operating modes and propagates between the conductor 53 and the central cylinder 51 in the manner previously described. Similarly, the wave associated with helical conductor 57 begins at feed point d and propagates in the manner previously described. Next, consider the waves whose directions of propagation have been reversed. The wave associated with helical conductor 52, in the second mode, propagates from a new feed point E' adjacent to the end wall 49c of the coupler housing toward the midplane p–p of the antenna. Similarly, the wave associated with helical conductor 56 propagates from a new feed point E adjacent to end wall 49b of the coupler toward the midplane p–p.

To provide reversal of wave propagation described above, the switching coupler 50 of FIG. 6 is provided with active control elements, such as dual rotary switches 80 and 81. On command, these switches can change the feed points associated with the helical conductors 52 and 56 in the following manner. The rotary switches 80 and 81 are seen in FIG. 6 in series with U-shaped coaxial extensions 71 and 70, respectively at the apex of the arcuate loops of these extensions. Each rotary switch consists of two pairs of curved conductor segments 82 and 83 positioned within a housing 84. Housing 84 (and, more particularly, curved segments 82 and 83) can be repositioned to provide the first and second operating modes for the helical antenna:

(1) In the manner depicted in FIG. 6 (first operating mode of the antenna system) the curved segments 82 of the switches 80 and 81 are connected in series with stationary gate points x, w and m, n at the apex of the U-shaped coaxial extensions 71 and 70, respectively, to provide coupling of the energy to helical conductors 52 and 56 at the feed points a and c adjacent to the midplane p–p of the antenna. Curved segments 83 of the rotary switches 80 and 81 are connected in series with stationary gate points y, z and r, s so as to terminate the helical conductors 52 and 56 with the matched loads 90 and 92 and the remote ends (with respect to plane p–p) of the helical conductors 52 and 56. Because of the interconnection of the loads 90 and 92, after the first and second pairs of electromagnetic waves have propagated from the feed points a, b, c and d adjacent to midplane p–p to the remote ends of the antenna, reflection of the energy back toward the midpoint of the antenna is minimized.

Figure 6B:
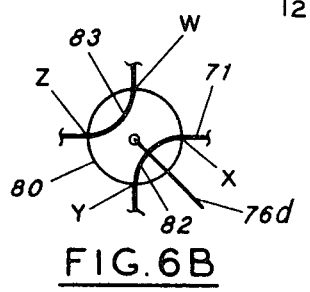
FIG. 6b is another detail of the switching coupler of FIG. 6 operating in the second operating mode.
Figure 6A:
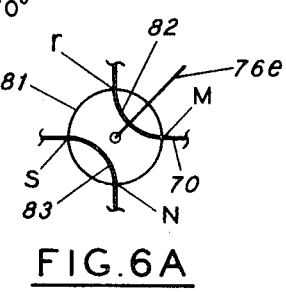
FIG. 6a is a detail of the switching coupler of FIG. 6 operating in a second operating mode.

(2) In the second operating mode of the antenna, the rotary switches 80 and 81 are actuated by control signals originating uphole from the antenna and entering coupler 50 via connector 65 and being conveyed to the switches 80 and 81 by line conductors 76d and 76e, respectively. The effect of the actuation of rotary switches 80 and 81 is to reorient the curved segments 82 and 83 of each rotary switch 80 or 81 to new positions depicted in FIGS. 6a and 6b. In detail FIG. 6a depicts rotary switch 81 in an angular position required for the second mode of operation of the helical antenna. In still more detail, the curved segment 82 of the switch 81 is seen to be placed in a new location circumferentially spaced about 90° from the stationary gate points m and n of FIG. 6. In that way, peripheral stationary gate points m and r, in FIG. 6a, are now electrically connected via segment 82. Thus, as seen in phantom line in FIG. 6, energy can be coupled to helical conductor 56 at feed point E located adjacent to end wall 49b of the coupler housing. The resulting electromagnetic wave associated with the helical conductor 56 will propagate from the feed point E toward the midplane p–p; adjacent to the midplane p–p the wave will then be coupled via a portion of extension 70 through segment 83 of the switch 81 (between gate points n and s) to matched load 92. In FIG. 6b, curved segment 82 of the switch 80 has likewise been placed in a new location from that depicted in FIG. 6. In more detail, peripherally spaced stationary gate points x and y are now electrically connected by curved segment 82. In that way, energy passing into the coupler 50 of FIG. 6 is conveyed along a segment of extension 71 to the switch 80 and thence along segment 82 (shown in phantom line in FIG. 6 between stationary gate points x and y) to the remote end of helical conductor 52, i.e., to feed point E' marking the feed point of helical conductor 52 in the second mode of operation. Thus, the resulting electromagnetic wave associated with helical conductor 52 will propagate from the feed point E' at the remote end of the antenna towards the midplane p–p, the wave then being dissipated at matched load 90 by passage along a portion of segment 71, and segment 83 of switch 80 (between stationary gate points w and z) to matched load 90. Thus, the effect of operating the rotary switches 80 and 81, in tandem, is to switch the feed points of the helical conductors 52 and 56 from feed points a and c adjacent to midplane p–p to the feed points E' and E at the ends of the antenna. The resulting pairs of helical conductors can interact in a manner to create a far more directive radiation pattern in the manner described in more detail hereinafter.

It is also evident, irrespective of the mode of excitation of the helical antenna via rotary switches 80 and 81, that the matched loads 90, 91, 92 and 93 are always located at the terminating ends of the helical conductors 52, 53 and 56, 57. Accordingly, irrespective of the direction of travel of the electromagnetic waves comprising each of the first and second pairs of electromagnetic waves, reflections of such waves from the remote terminals of the antenna are minimized.

Figure 9:
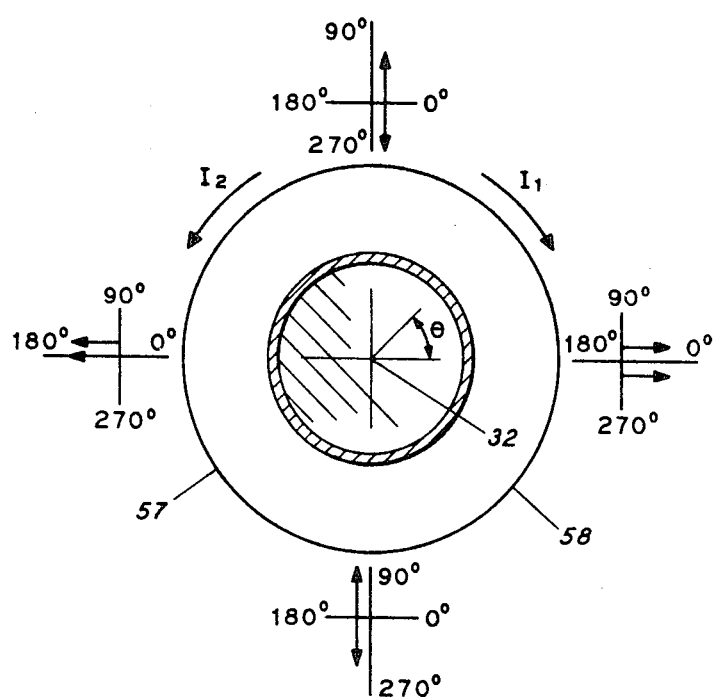
FIG. 9 is a sectional view taken along line 9-9 of FIG. 6 illustrating, in detail, the operational principles of the helical antenna of the present invention operating in a second operational mode to provide a directive, in-line symmetrical radiation pattern (figure eight)

In the second mode, each pair of waves, though complex in operation, must propagate so that their phases, at varying azimuthal angles, combine in a predetermined manner although the waves themselves vary periodically with distance from the midplane p–p of coupler 50. As previously described, the electric field component of each pair of waves can be thought of as lying parallel to an incremental length of helical conductor from which the energy radiates. Thus, each electric field component of the propagating wave can be thought of as having an instantaneous traveling wave current phaser in the incremental length of helical conductor. Referring now to FIG. 9, the traveling wave phasers $I_1$ and $I_2$ at varying azimuthal angles $\theta$ along helical conductors 56 and 57 measured with respect to axis 32 of the antenna are illustrated during the second mode of operation of the helical antenna of the present invention. As indicated at azimuthal angles ($\theta$) 0° and 180°, the phasers are algebraically additive, i.e., at $\theta$ equals 0° and 180°, the phasers $I_2$ and $I_1$ are in phase; but at the azimuthal angles ($\theta$) of 90° and 270°, they are 180° out of phase and therefore cancel.

Figure 10:
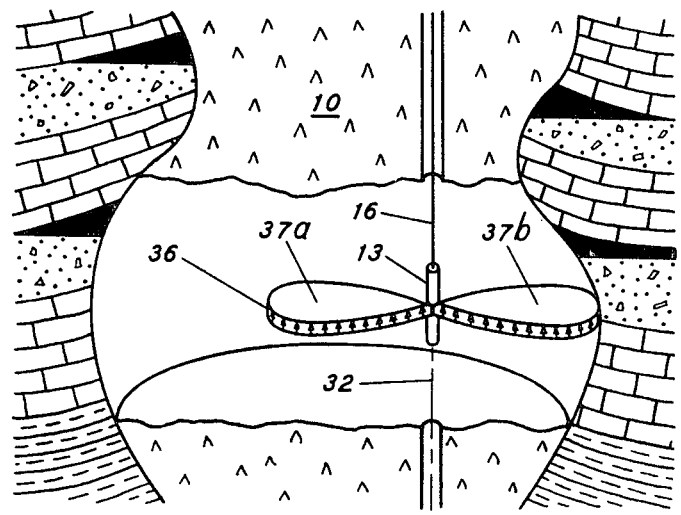
FIG. 10 is a partially perspective section of the salt dome of FIG. 1 modified to illustrate the directive figure eight radiation pattern generated by the helical antenna of the present invention operating in the second operational mode.

FIG. 10 is a perspective section of the salt dome 10 of FIG. 1 illustrating the directive radiation pattern, in azimuth, generated by the helical antenna of the present invention (operating in the second operating mode) housed within sonde 13. As shown, the radiated field, in elevation, remains highly directional in a plane perpendicular to the axis 32 of the antenna. The section of energy (called a wavefront) is generally indicated at 36 and defines diametrically located in-line beam lobes 37a and 37b, which define a figure-eight radiation pattern. As shown, the lobes 37a and 37b are diametrically located with respect to the axis 32 of the antenna and have a quasi-elliptical shape, one end of which lies on the axis 32 of the antenna, and a rather narrow effective beam width, say less than 10°. (The antenna beam width may be arbitrarily defined as the angular distance between two directions to space where the power has half the maximum value.) The electric field components of the energy are seen to be vertically polarized.

The figure-eight radiation pattern of FIG. 10 need not be fixed in azimuth. By operation of phase shifting means 75 of FIG. 6, in the manner explained below, the lobes 37a and 37b of the radiation pattern can be "steered" (rotated) through various azimuthal angles relative to the axis 32 of the antenna.

Referring again to FIG. 6, it will be recalled that phase shifting means 75, previously described with the antenna of FIG. 6, is useful in properly phasing energy coupled from or to the antenna so as to provide correct phase relationships of the traveling electromagnetic waves propagating along the antenna. After correct phasing has occurred, the phase shifting means 75 can also be systematically changed from a setpoint value so as to rotate the primary direction of the antenna lobes 37a and 37b through various azimuthal directions relative to the borehole. Thus, after the omnidirectional first operating mode is used for searching for the reflecting discontinuities and reflecting discontinuities are found, the operating mode of the antenna can be easily switched to its more directive second operating mode to acquire the detailed dimensions of the discontinuities.

Polarization of the figure-eight radiated field into the surrounding earth formation also can be easily changed utilizing the two-stage phase shifters 77 and 79 of FIG. 6. As previously described, phase shifter 77 electrically connects uphole by wire conductor 76b to control circuitry within energization section 40; likewise, the phase shifter 79 electrically connects through wire conductor 76c to the same control circuitry. After the variable phase shifting means 75 has been established at a setpoint level, the phase shifters 77 and 79 can be operated in their second setting, 180° phase shift setting. Of course, in their 0° phase shift setting the phase shifters 77 and 79 couple energy directly to the helical conductors 52 and 57 without change in the phase of the coupled energy. However, in the second operating mode these phase shifters are activated through control signals in the circuitry uphole from the antenna, each phase shifter 77 and 79 operates to shift the phase of the energy 180° over that of the first 0° phase shift setting. The result: Traveling wave current phasers on similarly aligned portions of each pair of helical conductors are reoriented to provide horizontal polarized radiation. That is to say, when the phase shifters 77 and 79 are at 0° phase shift setting, the figure-eight radiation pattern is vertically polarized, as depicted in FIG. 10; but when they are at 180° phase shift setting, the direction of the polarization is converted to horizontal. The resulting radar images can be recorded at the console 25 at the earth's surface. If these resulting records are compared as a function of common azimuthal directions, it has been found that the textural nature of the discontinuity can be inferred. Critical factors of comparability include comparative signal amplitude, total absence of comparative signals, differing arrival times, etc. For example, for a particular discontinuity within the formation, say at the boundary of the salt dome, the energy in the vertical mode may be reflected and received as a single reflection signal, while for the same discontinuity, horizontally polarized energy may not provide a reflection signal at all.

FIG. 11 illustrates a modification of the coupler 50 of FIG. 6. In FIG. 11, the modified coupler 50' comprises a series of split segments of the inner conductor of the coaxial conductor 48'. The initial or main input/output segment of the split segments being designated by the number 67 so as to simplify the construction of the coupler 50. Main input/output segment 67' enters the coupler 50' at connector 66' and interior of the coupler, splits at point $k$ into three separate segments 101, 102 and 103. Segment 101 connects point $k$ to helical conductor 53' at feed point $b'$. Segment 101 connects point $k$ to helical conductor 53' at feed point $b'$. Segment 102 connects point $k$ to helical conductor 57' at feed point $d'$. Segment 103 extends from point $k$ at an acute angle with respect to segments 101 and 102 and, after a rather tortuous path, ultimately connects to helical conductors 52' and 56' at the feed points $a'$ and $c'$, respectively. Between point $k$ and feed points $a'$ and $c'$, the segment 103 can be seen to resemble the mirror image of the letter "R" lying on its side. A single rotary switch 95 is located at the arcuate portion 103a of the segment 103. Beyond the rotary switch 95, the base leg 103b of the segment 103 terminates at feed points $a'$ and $c'$ of the helical conductors 52' and 56'. In operation, rotary switch 95 is controlled by control signals originating at control circuitry and the rotary switch is electrically controlled by the aforementioned circuitry by wire conductor 96a which extends into coupler 50' at connector 65'. In this embodiment one rotary switch 95 duplicates the functions of the dual rotary switches 80 and 81 of FIG. 6, but has similar constructional features: As shown in FIG. 11, the rotary switch 95 includes first and second arcuate wire segments 97 and 98 housed within metallic housing 99.

To provide the proper mode of excitation to the helical antenna the coupler 50' operates in the following manner:

(1) In the first operating mode the rotary switch 95 is positioned as shown in FIG. 11 so that wire segment 97 couples stationary gate points $m'$ and $n'$ of the arcuate portion 103a of the segment 103 in electrical contact with the main input/output segment 67'. In that manner energy can be coupled to the helical conductors 52', 53', 56' and 57' at the feed points $a'$, $b'$, $c'$ and $d'$ so as to provide for the propagation of first and second pairs of electromagnetic waves from the midplane $p'-p'$ in opposite axial direction towards the ends 89a and 89b of the coupler 50'. As the waves associated with the helical conductors 52' and 56' reach the ends of these conductors (adjacent to the ends 89a and 89b of the coupler), they are seen to be dissipated interior of the coupler by connecting the helical conductors 52' and 56' to matched load 111. Matched load 111 connects to the ends of the helical conductors 52' and 56' by means of a rather long common axially extending wire segment 107 which connects at about its midpoint through trunk segment 108 to the matched load 111. In that way segment 98 of the switch 95 can be seen to connect the stationary gate points $r'$ and $s'$ of the trunk segment 108 together. In similar manner, matched loads 112 and 113 connect to the remote ends of the helical conductors 53' and 57', respectively, interior of the coupler 50'. During propagation in the first operating mode, energy will be radiated from the antenna in the omnidirectional (pancake) radiation pattern; similarly, energy will be received from discontinuities within the adjacent formation in the manner previously described.

(2) In a second operating mode the rotary switch 95 is positioned as shown in FIG. 11a (and in phantom line in FIG. 11) whereby arcuate segment 97 connects stationary gate points $r'$ and $m'$ together so that the input section of the arcuate segment 103a (i.e., the section closest to the main input/output segment 67') is coupled, electrically, to axially extending segment 107 through trunk segment 108. It will be recalled from a discussion of FIG. 11 that segment 107 extends nearly the total length of the coupler 50' and terminates adjacent to the ends 89a and 89b in contact with the helical conductors 52' and 56'. It can now be observed that points $\theta$ and $\Phi$ represent the initial feed points of the energy to the helical conductors 52' and 56' in the second operating mode. In the second operating mode, the remaining arcuate segment 98 is indicated as connecting the stationary gate points $n'$ and $n'$ together. Since the base leg 103b of the segment 103 (FIG. 11) is now connected directly to matched load 111, electromagnetic waves associated with helical conductors 52' and 56' will be properly terminated so as to prevent the production of reflected waves from the end points of the helical conductors.

Thus, the effect of actuating rotary switch 95 to assume the position illustrated in FIGS. 11 and 11a is to switch the feed points of the helical conductors 52' and 56' from the feed points $a'$ and $c'$ to the axially remote feed points $\theta$ and $\Phi$ (FIG. 11). In this manner, opposite propagation directions of the electromagnetic waves constituting the first and second pairs of waves can be initiated so as to provide either an omnidirectional radiation pattern (first operating mode) or a more directive figure-eight radiation pattern (second operating mode).

It is evident, irrespective of the mode of excitation provided via switch 95, that the matched loads 111, 112 and 113 are always located so as to correctly terminate the helical conductors 52', 53' and 56', 57'. In that way reflections of such waves (from the end points of the helical conductors) are minimized. It is also evident that operation of variable phase shifter 115 located in series with leg 103c of segment 103, as well as the operation of two-stage phase shifters 116 and 117 (0° or 180°) located in segment 102 and segment 107, respectively, can operate to achieve the radiation patterns of the type previously described. Not only can the variable phase shifter 115 be useful in matching the phase of the energy being fed to the antenna in the first operating mode, but it can be useful in the second operating mode to steer the figure-eight radiation pattern through various azimuthal directions with respect to the axis of the antenna. Similarly, the phase shifters 116 and 117 with two settings (0° or 180°) are useful in providing energy in either the vertical or horizontal polarizing mode in the manner previously described.

Modifications

It should be mentioned in my copending application, Ser. No. 876,479 ("Passively Controlled Duplexer Coupler Applied to A Helical Antenna For Use In A Borehole Penetrating An Earth Formation," filed concurrently with the instant application) there is disclosed a helical antenna system in which the functions of the duplexer and direct-linkage coupler have been combined into a single, compact unit. Briefly, in the aforementioned copending application, first and second pairs of helical elements of the antenna receive energy from a source located uphole from the antenna through a novel duplexer-coupler located within the interior of the central mast of the helical antenna system. The duplexer-coupler employs no active elements in performing its dual functions: (i) coupling high power energy from the transmitter to the antenna while isolating such energy from the receiving circuitry and (ii) coupling return echoes of transmitted energy to the receiver while isolating such signals from the transmitter. In the aforementioned application, I have provided passive, power dependent switches within the coupler which are positioned in appropriate split arms of the coupler and are only activated as a function of the power level of the energy passing through the switches. No active elements are used. Simultaneously, by constructed the distances of varying coaxial arms within the coupler, the energy input to the helical antenna can be properly phased so as to provide radiated energy polarized in a single direction, say vertically with respect to the earth's surface, yet, in the receiving mode, the coupler can reactivate one helical conductor of each conducting pair so that the antenna has a maximum receiving sensitivity when the incident reflection signal is of the other polarized mode, say horizontal. In that way the antenna system can provide cross-polarized reflection images. By recording these images and comparing them, increased resolution as to the true nature of the electromagnetic discontinuity can be obtained.

Concepts described and claimed in the aforementioned application can be combined with the invention described and claimed in the instant application, without departing from the intent or scope of the present invention. In that way, the advantages of using a single duplexer-coupler for energizing a helical antenna system can be combined with the advantages of using active control elements within the duplexer-coupler for switching the radiation pattern—in elevation —from, say, an omnidirectional pattern to a more directional figure-eight radiation pattern, even though the antenna system is located thousands of feet below the earth's surface.

Further, while certain preferred embodiments of this invention have been specifically disclosed, it should be understood that still other variations will be readily apparent to those skilled in the art. As a further example, instead of using a helical antenna having coextensive first and second pairs of helical conductors winding in opposite directions about a central mast, it is evident that a single pair of helical conductors 118 and 119 as shown in FIG. 12 could be utilized in combination with a central mast 120 to form a radiation receiving antenna system. As shown in FIG. 12, helical conductors 118 and 119 as well as central mast 120 are electrically coupled to and actuated by uphole systems connected to the antenna by means of coupler 123. Coupler 123 is positioned within central mast 120 and consists of a central housing 124 through which input/output segment 127 of the inner conductor of coaxial line 125 is split into a series of subsegments to provide desired modes of excitation to the antenna as described hereinafter. It is evident that the outer conductor of the coaxial line 125 is connected through the housing 124 to the mast 120, at the connector 126. Input/output segment 127 is seen to be split at point $k'$ to form subsegments 128 and 129. Subsegment 129 extends longitudinally along the axis of the antenna for connection to the helical conductor 118. Subsegment 128 is seen to extend through rotary switch 131 for connection to helical conductor 119. Rotary switch 131 can be energized to have the following operating conditions:

(1) In a first operating mode (generation of omnidirectional radiation) switch 131 provides direct linkage between the helical conductor 119 and the input/output segment 127. As seen, the curved segment 132 of the switch 131 connects the former with the latter. In that way, a pair of electromagnetic waves can be seen to emanate at feed points $q$ and $u$ adjacent to the end wall 134 of the coupler. These waves, as they propagate in tandem adjacent to the helical conductors 118 and 119, provide the irradiation of energy in the omnidirectional mode—that is, in planes perpendicular to the central axis of the antenna. The other arcuate segment 133 of the switch 131 is seen to connect the remote end of helical conductor 119 to matched load 135. Another matched load 136 is located at the remote end of helical conductor 118.

(2) In the second operating mode (generation of figure-eight radiation) the rotary switch 131 connects, by arcuate segment 132 shown in phantom line, the stationary gate points $\psi$ and $\beta$ together so that the incoming or outgoing energy relative to the switch 131 can be coupled from the input/output segment 127 to the opposite end of the helical conductor 119. In that way energy can be fed to the helical conductor 119 at feed point $i$ adjacent to end wall 138. In the second operating mode, a pair of electromagnetic waves propagate in opposite directions relative to each other. Result: traveling wave current phasers interact in the manner previously described to produce in planes perpendicular to the longitudinal axis of the antenna a figure-eight directive radiation pattern. The arcuate segment 133 of the switch 131 (as shown in phantom line) connects the terminal end of the helical conductor 119 to the matched load 135.

It is also desirable that a variable phase shifter 139 be positioned in series with the subsegment 129. If the variable phase shifter 139 is so positioned, the relative phase of the pair of electromagnetic waves can be varied to insure proper interaction whether the antenna is operating in the first or second operating modes. It is evident in the first operating mode that the phase of the energy at feed points $q$ and $u$ must be 180° out of phase to insure proper interaction of the traveling wave current phasers. In the second operating mode, the phase of the energy can also be varied by phase shifter 139 to "steer" the figure-eight directional beam in azimuth.

I claim:

1. In a subsurface earth formation exploration tool for logging an earth formation penetrated by a borehole to approximate the distance and direction to an electromagnetic discontinuity in said formation from said borehole by measuring the two-way travel time of electromagnetic energy generated by means of an energization circuit including a source of electromagnetic energy and a control circuit means, uphole or interior of said tool, a helical antenna supported within said tool for irradiating said formation with a two-condition, selectively variable pattern of electromagnetic radiation, in azimuth, comprising:
   a. a central conducting element axially elongated substantially along the axis of said well bore,
   b. at least N pair(s) of helical conducting elements wound axially along and radially spaced outwardly from said central element, where N is any whole number greater than zero, each helical conducting element of each N pair(s) of elements winding in the same circumferential direction about said central element toward a common end of said central element, c. switching coupler means positioned interior of said central element and including a plurality of feed points positioned along said helical antenna for coupling, from said energization circuit, electromagnetic energy between said central element and said N pair(s) of helical elements, and condition means operatively connected to and controlled by said control circuit means for coupling, among said plurality of feed points, electromagnetic energy to a first subset of feed points in a first discrete operating state so as to produce, along said antenna, at least N coextensively propagating pair(s) of electromagnetic waves propagating in phase along said antenna in a common axial direction, said N pair(s) of electromagnetic energy radiating from said antenna in phase into said adjacent earth formation in planes substantially transverse to the axis of said well bore to produce a uniform, omnidirectional transverse radiation pattern, said conditioning means, in a second discrete operating state, in response to a change in condition within said control circuit means, sequentially decoupling N adjacent feed point(s) of said subset of feed points from operative contact with said energization circuit and then coupling N end feed point(s) to said energization circuit whereby N pair(s) of coextensively propagating electromagnetic waves are produced, said N pair(s) of electromagnetic waves, in said second discrete operating state, each traveling in opposite axial directions along said antenna but interacting so as to irradiate, into such adjacent earth formation, a highly directional, figure-eight pattern of electromagnetic energy.

2. The helical antenna of claim 1 in which $N$ 1, whereby one pair of electromagnetic waves is generated between one pair of helical conducting elements and said central element, and, in said first discrete operating state, propagate along said central element in a common axial direction but, in said second discrete operating state, said waves of said one pair of waves propagate in opposite axial directions along said central element.

3. The helical antenna of claim 1 in which $N=2$, whereby first and second pairs of electromagnetic waves are generated between first and second pairs of helical conducting elements and said central element, in said first discrete operating state, each pair of electromagnetic waves begin substantially at the midplane of said central element and coextensively propagate in the same axial direction toward a common end of said central element to generate said omnidirectional transverse radiation pattern in said formation, said first pair propagating in an opposite axial direction as said second pair of waves, in said second discrete state, an individual first or second electromagnetic wave of each first and second pairs of waves propagates in coextensive relationship with another individual wave of the same pair of waves but in an opposite axial direction as said another wave so as to generate said directional, figure-eight pattern of electromagnetic radiation.

4. The helical antenna of claim 3 with the addition of phase shifting means electrically connected to said control circuit means and operated thereby, in said second discrete operating state, to selectively shift the phase of said first and second pairs of electromagnetic waves propagating between said first and second pairs of helical conducting elements and said central element so as to cause selective steerage, in azimuth, of said figure-eight pattern of radiation relative to the axis of said borehole and thereby aid in identifying the azimuthal direction of said discontinuity relative to said borehole axis.

5. The helical antenna of claim 4 with the addition of first and second phase shifting means equipped with two settings of 0° and 180° phase shifts electrically controlled by said control circuit and operative in said first and second discrete operating settings to shift the polarizing mode of said first and second pairs of electromagnetic waves from a first to a second polarizing mode.

6. The helical antenna of claim 3 in which said switching coupler is further characterized by a series of segmented conductor means interior of said central element, said series of conducting means joined together at a series of junctions interior of said central element and terminating in a plurality of terminating segments, said first subset of feed points in said first discrete operating state comprising four centrally disposed feed points connecting, through said terminal segments, said first and second pairs of helical conducting elements and said central element to said source of electromagnetic energy, said four central feed points defining corners of an imaginary parallelogram lying in a plane through said switching coupler, one set of adjacent diagonally located feed points being connected in series with said source of electromagnetic energy through selected lengths of said segmented conductor means so as to couple electromagnetic energy to said helical elements in a phase opposite to that coupled to the remaining set of diagonally located feed points.

7. The helical antenna of claim 6 in which said condition means is further characterized by first and second switch means each located adjacent to a remote end of said central element as measured from the midplane thereof, in said second discrete operating state, said first and second switch means operating to decouple said one set of adjacent diagonally located feed points from contact with said source of energy and then couple said source to said end feed points remote from said midplane to launch electromagnetic waves along said antenna in an opposite axial direction than in said first discrete operating state.

8. The helical antenna of claim 7 in which first and second switch means, in changing from said first to said second discrete operating states, simultaneously reorient matched loads located at remote ends of said central element to contact the terminal ends of said first and second pairs of helical conducting elements so as to prevent reflections of terminating electromagnetic waves back through said antenna toward said feed points.

9. The helical antenna of claim 6 in which said plurality of terminal segments of said conductor means interior of said central element connect, in series, to said source of electromagnetic energy through a variable phase shifting means and phase shifting means equipped with two settings of 0° and 180° phase shifts operative by said control circuit means to control the phase of said first and second pairs of electromagnetic waves relative to one another, said variable phase shifting means connecting, in series, between said condition means and said source of electromagnetic energy and operative to aid in selectively steering said figure-eight pattern of radiation, in said second discrete operating state, through selected azimuthal angles relative to the borehole axis, said first and second phase shifting means equipped with two settings of 0° and 180° phase shifts being connected in series between at least one helical element of each of said first and second pairs of helical elements and said source of electromagnetic energy and operative to shift the polarizing mode of said first and second pairs of electromagnetic waves propagating along said antenna from a first to a second polarizing mode.

10. The helical antenna of claim 9 in which said first polarizing mode is vertical and said second polarizing mode is horizontal.

11. The method of irradiating an earth formation penetrated by a borehole with a two-condition, selectively variable, pattern of electromagnetic energy whereby the distance and direction of an electromagnetic discontinuity within said formation, from said borehole, can be indicated and identified, comprising the steps of:

in a transmitting mode, coupling electromagnetic energy from a source of energy to N pair(s) of helical conductors and a central cylindrical element coextensive with said helical conductors at a subset of feed points to propagate N pair(s) of electromagnetic waves in coextensive relationship along and radiating from said conductors into said formation, each of said waves being specified in terms of voltages existing between the helical conductors and the central cylindrical element and of currents carried by the helical conducting elements and by said cylindrical element, where N is any whole number greater than zero;

directing said N pair(s) of electromagnetic waves in helical paths of common angular direction about said cylindrical element toward N remote end(s) of said cylindrical element;

controlling, in a first discrete operating state, the direction of current phasers of said N pair(s) of electromagnetic waves as a function of the symmetrical position of said waves as measured along said antenna to irradiate electromagnetic energy into said earth formation which is omnidirectional in planes transverse to the axis of the borehole;

in a second discrete operating state, reversing the axial direction of travel of current phasers of N waves of said N pair(s) of coextensively propagating electromagnetic waves and thereafter controlling said reversed current phasers so as to irradiate into said formation a highly directional, in azimuth figure-eight radiation pattern.

12. The method as in claim 11 in which $N=1$ whereby one pair of electromagnetic waves is generated between one pair of helical conducting elements and said central element and, in said first discrete operating state, propagate along said central element in a common axial direction, but, in said second discrete operating state, said waves of said one pair of waves propagate in opposite axial directions along said central element.

13. A method as in claim 11 in which $N=2$ whereby first and second pairs of electromagnetic waves are generated between first and second pairs of helical conducting elements and said central element, is said first discrete operating state, each pair of electromagnetic waves begin approximately at the midplane of said central element and coextensively propagate in the same axial direction toward a common end of said central element to generate said omnidirectional transverse radiation pattern in said formation, said first pair propagating in an opposite axial direction as said second pair of waves, in said second discrete state, an individual electromagnetic wave of each of said first and second pairs of electromagnetic waves propagates in coextensive relationship with another individual wave of the same pair of waves but in an opposite axial direction as said another wave so as to irradiate said formation with said directional, figure-eight pattern of electromagnetic radiation.

14. A method as in claim 11 in which the steps of reversing the direction of current phasers and then controlling the reversed current phasers to provide a highly directional, figure-eight pattern of radiation in azimuth are further characterized by the additional step of steering said figure-eight radiation pattern through selected azimuthal angles relative to the axis of borehole to isolate the azimuthal direction of said discontinuity relative to said borehole axis.

15. A method in accordance with claim 13 with the additional step of switching polarizing mode of said first and second pairs of electromagnetic waves from a first mode to a second polarizing mode and thereafter comparing signals received from a common discontinuity in each polarizing mode so as to indicate textural nature of said discontinuity.